(12) United States Patent
Markwart et al.

(10) Patent No.: US 8,904,001 B2
(45) Date of Patent: Dec. 2, 2014

(54) SERVICE ACCESS

(75) Inventors: Christian Markwart, Munich (DE); Hans-Jochen Morper, Erdweg (DE)

(73) Assignee: Nokia Solutions and Networks Oy, Espoo (FI)

( * ) Notice: Subject to any disclaimer, the term of this patent is extended or adjusted under 35 U.S.C. 154(b) by 115 days.

(21) Appl. No.: 13/519,597

(22) PCT Filed: Dec. 30, 2009

(86) PCT No.: PCT/EP2009/068015
§ 371 (c)(1),
(2), (4) Date: Aug. 1, 2012

(87) PCT Pub. No.: WO2011/079862
PCT Pub. Date: Jul. 7, 2011

(65) Prior Publication Data
US 2012/0303811 A1   Nov. 29, 2012

(51) Int. Cl.
*G06F 15/16* (2006.01)
*H04L 29/08* (2006.01)
*H04W 8/18* (2009.01)
*H04W 84/04* (2009.01)

(52) U.S. Cl.
CPC ............... *H04L 67/16* (2013.01); *H04W 8/18* (2013.01); *H04W 84/045* (2013.01); *H04L 67/34* (2013.01)
USPC ........................................................ 709/225

(58) Field of Classification Search
USPC ........................................................ 709/225
See application file for complete search history.

(56) References Cited

U.S. PATENT DOCUMENTS

| | | | |
|---|---|---|---|
| 2004/0078591 A1* | 4/2004 | Teixeira et al. | 713/201 |
| 2004/0230965 A1 | 11/2004 | Okkonen | |
| 2005/0108133 A1 | 5/2005 | Balasubramanian et al. | |
| 2007/0254634 A1 | 11/2007 | Costa-Requena et al. | |
| 2008/0005325 A1* | 1/2008 | Wynn et al. | 709/225 |
| 2008/0113661 A1 | 5/2008 | Repka | |
| 2009/0285166 A1 | 11/2009 | Huber et al. | |
| 2010/0191846 A1* | 7/2010 | Raleigh | 709/224 |

FOREIGN PATENT DOCUMENTS

EP    1937009 A1    6/2008

OTHER PUBLICATIONS

International Search Report and Written Opinion corresponding to International Patent Application No. PCT/EP2009/068015 dated Dec. 15, 2010.
Broadband forum, Technical Report "TR-069, CPE WAN Management Protocol v1.1"; Version: Issue 1, Amendment 2; Version Date: Dec. 2007; XP-002493850, pp. 1-138.

* cited by examiner

*Primary Examiner* — Tu Nguyen
(74) *Attorney, Agent, or Firm* — Squire Patton Boggs (US) LLP

(57) ABSTRACT

The present invention relates to methods and apparatus for configuring end user equipment. A service broker may transmit access settings to an access node where the access settings are for a predetermined service provider. The access settings may be transmitted to end user equipment so that the predetermined service provider can access the end user equipment in order to configure the end user equipment to receive a service provided by the service provider.

14 Claims, 1 Drawing Sheet

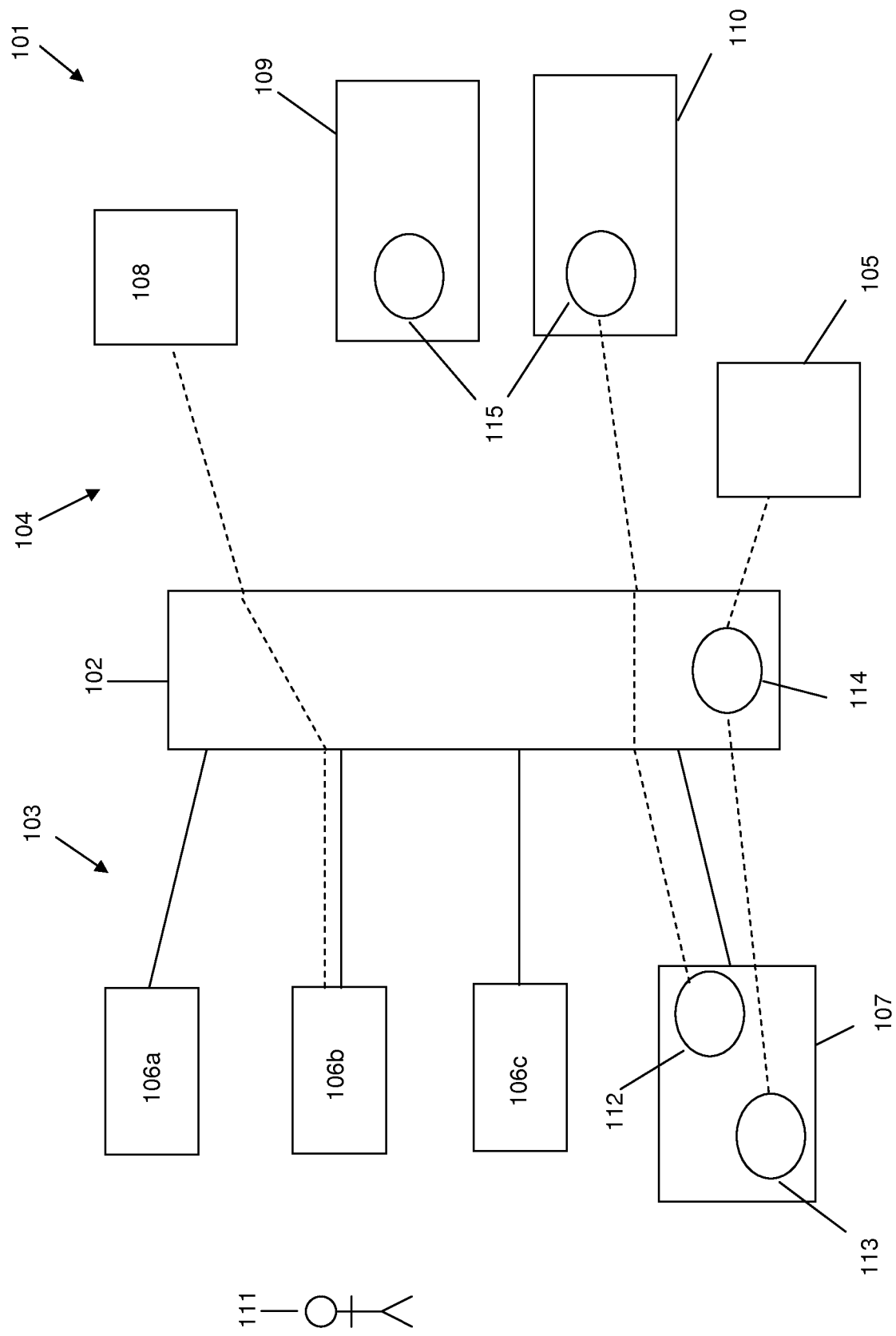

SERVICE ACCESS

BACKGROUND

1. Field

The present invention relates to providing an improved service access between a user and at least one service provider.

2. Description of Related Art

Presently, there are a multitude of different services that are available to a user each of which may be offered by a different service provider. For example, a Mobile Network Operator (MNO) may provide the service of mobile voice and data calls, an Internet Service Provider (ISP) may provide the service of Internet access, a telecommunication operator (Telco) may provide the service of fixed voice calls, an access provider may provide the service of broadband access, a further service provider may provide the service of Internet Protocol Television (IPTV) or Video on Demand (VoD) and so on. Furthermore, it is expected that in the future as technologies advance more and more different services will become available to the user where different service providers may also offer those services.

Accordingly, a user that requires more than one service will typically have to sign a contract with each of the different service providers. However, having several contracts with several service providers for different services, where each contract will most likely have different terms and conditions, different tariffs or costs, different points of contact, different contract lengths etc, may cause confusion and difficulties for the user.

Therefore, a user would prefer to have a single contract for all, or for the majority, of the services they want to use which has been recognised in the industry. In order to address this, one service provider, e.g. a Telco, may expand their operations to include further services such as Internet access which they can offer as a package to the user. In another mode of operation, several service providers may agree to offer their services as part of a package with one of the service providers acting as the face to the user. In a further mode of operation, a separate company may have an agreement with the service providers to package several services together where the service broker offers the package to a user.

However, in each of the above modes of operation the user is restricted to receiving the services that are provided as part of the package. For example, one package may include an excellent fixed service and mobile service but a poor Internet access service as there is no flexibility in the package of services. Furthermore, in each of the above modes of operation the company or service provider that is facing the end user and providing a package of services may be known as a service broker.

Typically, in order for a user to receive a service they require specific end user equipment or node, e.g. a set top box, to be connected to the user's home network via an access router. Alternatively, the access router may include the functionality necessary to enable the user to receive the service where the functionality is typically separate to the access router's normal functionality, for example a print server may be incorporated into the access router.

An access router is typically the access point between the user's home network and an external network which may be based on various communication protocols and technologies such as a Digital Subscriber Line (DSL) network, cable network, Passive optical Network (PON), satellite network and so on. Thus, the access router typically includes various functionalities such as Dynamic Host Configuration Protocol (DCHP), Network Address Translation (NAT), a firewall and so on. The standard functionality of an access router is well known in the art and therefore not described in detail.

The specific end user equipment is typically provided by the service provider and as such is usually branded by the service provider meaning that it cannot be re-used by a different service provider should the user decide to switch the supplier of a particular service. The service provider supplying the end user equipment will typically also want control over the end user equipment in order to commission the end user equipment but also to prevent users or other third parties from performing any unauthorised alterations to the end user equipment. Moreover, as the service provider supplies the end user equipment then the cost of manufacturing the end user equipment will typically be added to the tariff or subscription charges levied by the service provider.

Thus, there is currently a need to provide the ability to enable a service broker to use generic end user equipment, to be able to flexibly choose any service provider for a particular service and to enable the chosen service provider to configure the generic end user equipment as the service broker may not have the means or the ability to control and configure the end user equipment.

SUMMARY

According to a first aspect of the present invention there is provided a method comprising the steps of: receiving access settings from a service broker wherein the access settings are for a predetermined service provider; and transmitting the access settings to an end user equipment such that the predetermined service provider can access the end user equipment in order to configure the end user equipment to receive a service provided by the service provider.

The access settings may include the predetermined service provider's certificates for the end user equipment, user identity and/or password, connection parameters and so on. As will be appreciated, for different service providers and for different services the access settings may include all access settings necessary to permit the predetermined service provider to access the end user equipment.

Thus, once the access settings are assigned to the end user equipment then only the predetermined service provider may access the end user equipment. The predetermined service provider may then have the ability to access and configure the end user equipment.

The settings may further include parameters to block a further service provider from accessing the end user equipment. Therefore, if one service provider is currently providing a service via the end user equipment then they can be blocked from accessing the end user equipment enabling a different service provider, e.g. the predetermined service provider, to gain access to the end user equipment. This has the advantage that the same end user equipment can be used when changing the service provider for a given service.

The predetermined service provider may be predetermined by the service broker from at least one service provider that is able to provide the service based on at least one predetermined criteria. Thus, the service broker may predetermine which service provider, from all available service providers, is to provide the service to the end user equipment based on any relevant predetermined criteria. For example, the predetermined criteria may include geographical region or location, quality of service, regulatory issues, user's wishes and so on. As will be appreciated, the predetermined criteria may include any criteria that are relevant to making a choice as to which service provider is to provide the service to the end user equipment. The predetermined criteria may be different for different service providers and different services.

The access settings may be received at an access node and the end user equipment may be separate to the access node or the end user equipment may be integrated with the access node. The access node may be an access router. The access node may be the gateway between a user's home network and an eternal network. The end user equipment may be separate to the access node, for example, a set top box that may be operatively connected to the access node. Alternatively, the end user equipment may be integrated with the access node either a part of the hardware of the access node or as functionality.

The method may further comprise the steps of receiving functionality from the service broker wherein the functionality is the end user equipment; and installing the functionality. Thus, if the functionality required to enable the end user to receive and use the service can be integrated with the access node then the service broker may transmit the functionality to the access node. The access node may therefore receive the functionality from the service broker and install the functionality on the access node and as such the access node becomes the end user equipment.

According to a second aspect of the present invention there is provided an apparatus comprising: a first input adapted to receive access settings from a service broker wherein the access settings are for a predetermined service provider; and an output adapted to transmit the access settings to an end user equipment such that the predetermined service provider is permitted to access the end user equipment in order to configure the end user equipment to receive a service provided by the service provider.

The settings may be received at an access node.

According to a third aspect of the present invention there is provided an access node comprising: an input adapted to receive access settings from a service broker wherein the access settings are for a predetermined service provider; and an output adapted to transmit the access settings to an end user equipment such that the predetermined service provider can access the end user equipment in order to configure the end user equipment to receive a service provided by the service provider.

The access node may be an access router. The end user equipment may be separate to the access node or the end user equipment may be integrated with the access node.

The apparatus may further comprise a second input adapted to receive functionality from said service broker wherein said functionality is said end user equipment; and a processor adapted to install said functionality. The first input and the second input may be the same input or different inputs.

According to a fourth aspect of the present invention there is provided a computer program product comprising computer readable executable code for: receiving access settings from a service broker wherein the access settings are for a predetermined service provider; and transmitting the access settings to an end user equipment such that the predetermined service provider can access the end user equipment in order to configure the end user equipment to receive a service provided by the service provider.

The computer program product may further comprise computer readable executable code for performing any or all of the functions in accordance with the aspects of the invention.

According to fifth aspect of the present invention there is provided a method comprising the steps of: receiving at an end user equipment access settings wherein the access settings are for a predetermined service provider; storing the access settings in the end user equipment; and receiving at the end user equipment configuration settings from the predetermined service provider wherein the configuration settings configure the end user equipment to receive a service provided by the predetermined service provider.

Thus, the end user equipment receives and stores access settings for the predetermined service provider. This has the advantage that unbranded end user equipment may be provided as the access settings received at the end user equipment identify the predetermined service provider so that only the predetermined service provider can access the end user equipment and provide the configuration settings to the end user equipment.

The access settings may further include parameters to block a further service provider from accessing the end user equipment. Therefore, if one service provider is currently providing a service via the end user equipment then they can be blocked from accessing the end user equipment enabling a different service provider, e.g. the predetermined service provider, to gain access to the end user equipment. This has the advantage that the same end user equipment can be used when changing the service provider for a given service.

The access settings may be received from an access node. The access settings may be received from a service broker. The end user equipment may be separate to the access node or the end user equipment may be integrated with the access node.

According to a sixth aspect of the present invention there may be provided an apparatus comprising: a first input adapted to receive at an end user equipment access settings wherein the access settings are for a predetermined service provider; a processor adapted to store the access settings in the end user equipment; and a second input adapted to receive at the end user equipment configuration settings from the predetermined service provider wherein the configuration settings configure the end user equipment to receive a service provided by the predetermined service provider.

According to a seventh aspect of the present invention there is provided end user equipment comprising: a first input adapted to receive access settings wherein the access settings are for a predetermined service provider; a processor adapted to store the access settings; and a second input adapted to receive configuration settings from the predetermined service provider wherein the configuration settings configure the end user equipment to receive a service provided by the predetermined service provider.

The access settings may be received from an access node and the end user equipment may be separate to the access node or the end user equipment may be integrated with the access node.

The first input and the second input may be the same input or different inputs.

According to a eighth aspect of the present invention there is provided a computer program product comprising computer readable executable code for: receiving at an end user equipment access settings wherein the access settings are for a predetermined service provider; storing the access settings in the end user equipment; and receiving at the end user equipment configuration settings from the predetermined service provider wherein the configuration settings configure the end user equipment to receive a service provided by the predetermined service provider.

The computer program product may further comprise computer readable executable code for performing any or all of the functions in accordance with the aspects of the invention.

According to an ninth aspect there is provided a system comprising end user equipment and an access node wherein the end user equipment is operatively connected to the access node; the system is adapted such that: the access node receives access settings from a service broker wherein the access settings are for a predetermined service provider; the access node transmits the access settings to the end user equipment; the end user equipment receives the access settings; the end user equipment stores the access settings; and the end user equipment receives configuration settings from the predetermined service provider wherein the configuration settings configure the end user equipment to receive a service provided by the predetermined service provider.

BRIEF DESCRIPTION OF THE DRAWINGS

Embodiments of the present invention will now be described, by way of example only, and with reference the accompanying drawings in which:

FIG. 1 shows a block diagram in accordance with many embodiments of the present invention.

DETAILED DESCRIPTION

In many of the embodiments of the present invention there are provided methods, apparatus and systems for enabling a more flexible and efficient mechanism for providing services to users. FIG. 1 shows a simplified block diagram of a system 101 in accordance with many of the embodiments of the present invention.

In many of the embodiments a service broker 105 will be the single point of contact for a user 111 in order to obtain the services the user 111 wishes to receive irrespective of the service provider or number of service providers 108, 109, 110 that are available. The service broker 105 may be an existing service provider or may be a separate company that provides the functionality of a service broker.

In the system 101 an access router 102 acts as the interface between the users's home network 103 and the external network 104 e.g. a DSL network. The access router 102 may include functionality to enable the entities 106a, 106b, 106c on the user's home network 103 to transmit data to and receive data from entities located on the external network 104. The standard functionality of an access router 102 is well known to a person skilled in the art and therefore will not be described in detail.

The access router 102 may be provided to the user 111 by the service broker 105 or the user 111 may purchase the access router 102 from a retailer or a service provider. On the user's home network 103 the user may have several entities, or end user equipment, operatively connected to the access router 102 which enable the user to receive services that they have registered or signed up for. For example, the end user equipment may include a computer 106a for internet access, an IPTV box 106b to receive IPTV, a personal phone 106c to make mobile and/or fixed line voice calls and so on. As a person skilled in the art will appreciate, there are many different services that a user 111 may receive and that for each service a specific end user equipment entity may be required. As will be further appreciated, for some services, e.g. Internet access, the functionality may be incorporated into the access router 102 rather than require an extra entity attached to the access router 102 on the user's home network 103.

In the example shown in FIG. 1, a user 111 is currently receiving several services each of which may be determined or chosen by the service broker which enables the user 111 to have a single contract and point of contact for each service they receive. For example, as shown in FIG. 1 the user 111 is receiving an IPTV service from service provider 108 via the access router 102 and the IPTV end user equipment 106b. The service broker 105 may have determined service provider 108 was the best to provide the IPTV service based on one or more predetermined criteria such as the user's 111 choice, the geographical location and so on.

If the user 111 wishes to add a further service to their package then the user 111 may contact their service provider 105 requesting a particular service or services. Alternatively, the user 111 may not currently be receiving any services or wish to change service broker and/or service provider and therefore may contact the service broker 105 to start receiving one or more services as a package.

Irrespective of the service requested by the user 111 the service broker 105 will provide the necessary end user equipment 107 for the service.

Conventionally, the service provider of the service would supply the end user equipment as the service provider needs to be able to control the end user equipment in order to configure the end user equipment, to control the end user equipment and to prevent any unauthorised changes being made to the end user equipment. Thus, conventionally the service provider will supply branded end user equipment which means that the end user equipment may only be used for receiving the service from the service provider and, should the user change service provider, the end user equipment will have to be replaced with the new service provider's branded end user equipment. Accordingly, each service provider will have to manufacture or obtain end user equipment that is designed and branded solely for that service provider which will increase the service provider's costs. Plus, conventionally a service broker could not supply the end user equipment due to the reasons that the service provider requires control over the end user equipment or that the configuration and control of the end user equipment is too difficult or complicated for the service broker to manage.

However, many of the embodiments of the present invention provide a mechanism to enable the service broker to supply the user with generic end user equipment in order to address the problems and drawbacks described hereinabove.

Returning to FIG. 1, the service broker 105 supplies the user 111 with the end user equipment 107 for the service that the user 111 wishes to receive.

The end user equipment 107 supplied by the service broker 105 may include two functions that enable the end user equipment 107 to be provided by the service broker 105 whilst enabling a chosen or predetermined service provider from the more than one service providers 109, 110 available to configure and control the end user equipment 107. The functions also enable the end user equipment 107 to be used by a different service provider should the service provider be changed for a particular service. The first function may be a Node Assignment Client (NAC) function 113 and the second function may be a Node Control Client (NCC) function 112.

In the example shown in FIG. 1, the access router 102 is provided with a new function which may be a Node Assignment Server (NAS) function 114. However, the NAS function may be provided on the service broker's 105 servers.

Each of the service providers 109, 110 may also include a function which may be a Node Control Server (NCS) function 115.

Therefore, when a user 111 requests a new service from the service broker 105, the service broker 105 supplies or provides the end user equipment 107 necessary to enable the user 111 to receive the service. The user 111 may then take the necessary steps to operatively connect the end user equipment 107 to the user's home network 104 and to the access router 102.

The service broker 105 will determine which of the two available service providers 109, 110 will be chosen or predetermined to supply or provide the requested service to the user 111. As will be appreciated, there could be any number of service providers that are able to supply the service to the user, though in this example only two possible service providers are shown.

The service broker 105 may choose or predetermine the service provider that is to supply the service to the user 111 based on any relevant predetermined criteria. For example, the relevant predetermined criteria may include any of the geographical area or region, the quality of service, user's 111 wishes, inter-working criteria, regulatory issues and so on.

In this example, the service broker 105 may predetermine or choose the service provider 110 to provide the service to the user 111. The service broker 105 will instruct the NAS function 114 to transmit access settings to the NAC function 113 in the end user equipment 107. The access settings that the NAS function 114 is instructed to transmit to the NAC function 113 enable the end user equipment 107 to be configured such that only the chosen or predetermined service provider 110 can access, control and or configure the end user equipment 107 to receive the service provided by the service provider 110.

The access settings that the NAS function 114 is instructed to transmit to the end user equipment 107 via the NAC function 113 may include, for example, tunnelling parameters for the end user equipment 107, service provider specific certificates for the new end user equipment 107, activation/deactivation commands for particular service providers, user identification and/or password for the chosen service provider 110 and so on. As will be appreciated, for different services, end user equipment and different service providers the access settings necessary to grant access to a predetermined service provider may be different in each case.

Once the service broker 105 has communicated with the end user equipment 107 to apply the necessary access settings, the predetermined or chosen service provider 110 may then be able to access, control and configure the end user equipment 107. The service provider 110 transmits configuration settings to the end user equipment 107 via the NCS function 115 and the NCC function 112 in order to configure the end user equipment 107 thereby enabling the user 111 to receive the service they have requested. The predetermined service provider 110 may authenticate itself with the end user equipment 107 prior to transmitting the configuration settings via the access settings stored in the end user equipment 107.

Thus, many of the embodiments of the present invention enable any service to be provided to a user where the service broker can choose any of the available service providers to provide the service via generic/unbranded end user equipment supplied by the service broker. The service may be any service that is presently available, e.g. mobile voice, fixed voice, IPTV, broadband access and so on, or be a new service that may be available in the future.

One emerging technology and service that many of the embodiments may be applied to is the provision of cellular Femto access points into the user's home or business network. The Femto access point is a small cellular base station that is designed for use in a home or small business which connects to a service provider's network via a broadband wireline connection such as a DSL or cable network. The Femto access point enables service providers to extend service coverage indoors especially where access would otherwise be limited or unavailable and incorporates the functionality and capability of a typical base station Thus, the Femto Access Service that may be provided to a user provides cellular access at a user's home or business where a user's mobile communication device, e.g. a mobile phone, can connect and communicate with the Femto access point via the same radio access mechanisms as would be used to communicate with a base station in a public cellular network. As such, the user can use their mobile phone to make a call in the usual manner but if the user is at home then the call may be transferred via the Femto access point. This has several advantages including that the traffic from the mobile communication device is transferred or offloaded from the public cellular network onto a wireline network, for example, the Internet, using the user's broadband wireline connection from the user's home network. Therefore, resources in the public cellular network can be more efficiently used especially as the public cellular network may not be able to handle the expected increase in mobile traffic over the coming years.

This example of providing a Femto Access Service to a user will now be described, again with reference to FIG. 1. In FIG. 1, the end user equipment 107 supplied by the service broker 105 will be a Home eNode-B (H(e)NB) which is the Femto access point. As mentioned hereinabove, the functionality of the Femto access point may alternatively be integrated with the access router 102.

The H(e)NB 107 supplied by the service broker 105 will include the NAC function 113 and the NCC function 112. The service broker 105 may then predetermine or choose a service provider 110 of the service providers 109, 110 available that can provide the service based on relevant criteria, e.g. quality of service, region and so on. In the case of the example of providing the femto access service the service providers 109, 110 will typically be a Public Land Mobile Network (PLMN) operator.

Once the H(e)NB 107 has been operatively connected to the user's home network 104 and the access router 102 then the service broker 105 may then instruct the NAS function 114 on the access router 102 to transmit or communicate the necessary access settings to the H(e)NB 107 via the NAC function 113 on the H(e)NB 107. The access settings received by the access router 102 from the service broker 105 may include the access settings necessary to enable the predetermined or chosen service provider 110 to communicate with the H(e)NB 107 such that the service provider 110 can control and configure the H(e)NB 107, for example, the access settings may include authorisation and authentication settings. The access settings applied to the H(e)NB 107 by the service broker 105 via the NAS function 114 and the NAC function 113 enable the H(e)NB 107 to become a logical part of the service provider's network in terms of allowing the service provider 110 to control, manage and configure the H(e)NB 107. The service broker 105 may communicate with the NAS function 114 in the access router 102 using any one of several known communication protocols, for example, the communication may conform to the known TR-069 protocol. The service broker 105 may typically comprise one or more servers which may perform the steps of communicating with the access router 102 in order to instruct the NAS function 114 to apply the necessary settings to the H(e)NB 107. Alternatively, the NAS function 114 may be located on the service broker's servers which can communicate, via the access router 102, with the NAC function 113 on the H(e)NB 107.

Once the settings have been successfully applied to the H(e)NB 107 then the predetermined or chosen service provider 110 may communicate with the H(e)NB 107 via the NCS function 115 and the NCC function 112. The service provider is allowed to communicate with and access the H(e)NB 107 as the H(e)NB 107 was configured by the service broker with access settings that relate to the chosen or predetermined service provider 110. The service provider 110 may communicate with the H(e)NB 107 using any number of known communication protocols, for example, the communication may conform to the known TR-069 protocol. The service provider 110 can also perform all necessary procedures in order to configure, manage and control the H(e)NB 107, for example, the service provider 110 can perform discovery and registration procedures. The service provider 110 may transmit the necessary configuration settings to the H(e)NB 107 which enables the H(e)NB 107 to be configured to receive the requested service.

In the above described examples, a new service was being provisioned for a user. However, many of the embodiments also enable the service provider to be changed without requiring any new end user equipment. In this case the service broker via the NAS function may communicate with the end user equipment via the NAC function in order to apply new settings which may include the command or instruction to deactivate one service provider's access to the end user equipment. The new settings relating to the new predetermined or chosen service provider can then be applied to the end user equipment enabling the new service provider to access the end user equipment so as to provide the service to the user. Thus, the same end user equipment may be used for different service providers.

In the above examples, the NCS function was part of the service provider and would typically reside in the service provider's management systems or on a server or computing apparatus of the service provider. However, in many of the embodiments the NCS function may be located on a different entity or distributed between different entities belonging to the service provider. For example, in the above case of providing the Femto Access Service the NCS functionality may be located on, or distributed between the Security Gateway (SeGW), H(e)NB Gateway (H(e)NB-GW), Mobility Management Entity (MME) and so on.

In the above described examples, new end user equipment was initially configured by a service broker to enable a chosen or predetermined service provider to control and configure the end user equipment in order to provide the service to the user. However, in many of the embodiments the service to be provided to the user may allow the functionality to be incorporated in to other equipment such as the access router. In other words, depending on the service the "end user equipment" may be integrated in to the access router if it is appropriate and thus, the access router will become the end user equipment.

If the functionality required to receive and use the service may be integrated with the access router 102 then the service broker may initially download and install the functionality on the access router 102. Once the functionality has been downloaded and installed on the access router along with the NAC and NCC functionality then the access router effectively becomes the end user equipment and the process of configuring the end user equipment may follow the same procedure or process as described hereinabove. In other words, the NAS function may then communicate or transmit the necessary settings to the NAC function which enable the chosen or predetermined service provider to access, control and configure the new functionality installed on the access router to provide the service to the user. As described hereinabove, the service broker may be any company or service provider that provides a package of services to the end user.

Accordingly, many of the embodiments of the present invention have the advantage that a user to have a single contract or point of contact with a service broker whilst providing a choice of service provider for each of the services that the user wishes to receive. A further advantage is that the many embodiments enable a service broker to supply the end user equipment which is unbranded and therefore may be used by any service provider to provide the service for which the end user equipment is required. The service broker may apply settings or configure the end user equipment with parameters and details of the service provider that the service broker has predetermined or chosen to provide the service to the user. Thus, once the end user equipment has been configured by the service broker then the predetermined or chosen service provider may then communicate with the end user equipment in order to configure it so that it can receive the service from the service provider. Many of the embodiments also provide the ability to change the service provider with requiring new end user equipment by the service broker re-configuring the end user equipment to allow access from a different service provider. The end user equipment may be a separate entity or node attached to the user's home network or the end user equipment may be functionality that may be integrated into other entities on the user's home network such as an access router.

While preferred embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method comprising the steps of:
   receiving access settings from a service broker wherein said access settings are configured to control access by a predetermined service provider to an end user equipment; and
   transmitting said access settings to the end user equipment, wherein said predetermined service provider is configured to access said end user equipment subject to said access settings, and
   wherein said end user equipment is initially configured by said service broker to enable said predetermined service provider to control and configure said end user equipment in order to receive a service provided by said service provider.

2. The method as claimed in claim 1 in which said access settings further include parameters to block an other service provider from accessing said end user equipment.

3. The method as claimed in claim 1 in which said predetermined service provider is selected by said service broker from at least one service provider that is able to provide said service based on at least one predetermined criteria.

4. The method of claim 3, wherein the predetermined criteria comprises at least one of a geographical area or region, quality of service, a user's wishes, inter-working criteria or regulatory issues.

5. The method as claimed in claim 1 further comprising the steps of:
   receiving functionality from said service broker wherein said functionality is said end user equipment; and
   installing said functionality.

6. An apparatus comprising:
   a first input adapted to receive access settings from a service broker wherein said access settings are configured to control access by a predetermined service provider to an end user equipment; and an output adapted to transmit said access settings to the end user equipment, wherein said predetermined service provider is configured to access said end user equipment subject to said access settings, and wherein said end user equipment is initially configured by said service broker to enable said predetermined service provider to control and configure said end user equipment in order to receive a service provided by said service provider.

7. The apparatus as claimed in claim 6 further comprising:
a second input adapted to receive functionality from said service broker wherein said functionality is said end user equipment; and
a processor adapted to install said functionality.

8. A computer program product comprising a non-transitory computer-readable medium including executable code for:

receiving access settings from a service broker wherein said access settings are configured to control access by a predetermined service provider to an end user equipment; and transmitting said access settings to the end user equipment, wherein said predetermined service provider is configured to access said end user equipment subject to said access settings, and wherein said end user equipment is initially configured by said service broker to enable said predetermined service provider to control and configure said end user equipment in order to receive a service provided by said service provider.

9. A method comprising the steps of:

receiving at an end user equipment access settings wherein said access settings are configured to control access by a predetermined service provider to said end user equipment;

storing said access settings in said end user equipment; and receiving at said end user equipment configuration settings from said predetermined service provider wherein said configuration settings configure said end user equipment to receive a service provided by said predetermined service provider subject to said access settings, wherein said end user equipment is initially configured by a service broker to enable said predetermined service provider to control and configure said end user equipment.

10. The method as claimed in claim 9 in which said access settings further include parameters to block an other service provider from accessing said end user equipment.

11. The method as claimed in claim 9 in which said access settings are received from an access node and said end user equipment is separate to said access node or said end user equipment is integrated with said access node.

12. An apparatus comprising:
a first input adapted to receive at an end user equipment access settings wherein said access settings are configured to control access by a predetermined service provider to said end user equipment;
a processor adapted to store said access settings in said end user equipment; and
a second input adapted to receive at said end user equipment configuration settings from said predetermined service provider wherein said configuration settings configure said end user equipment to receive a service provided by said predetermined service provider subject to said access settings,
wherein said end user equipment is initially configured by a service broker to enable said predetermined service provider to control and configure said end user equipment.

13. The apparatus as claimed in claim 12 in which said access settings are received from an access node and said end user equipment is separate to said access node or said end user equipment is integrated with said access node.

14. A computer program product comprising a non-transitory computer-readable medium including executable code for:

receiving at an end user equipment access settings wherein said access settings are configured to control access by a predetermined service provider to said end user equipment;

storing said access settings in said end user equipment; and receiving at said end user equipment configuration settings from said predetermined service provider wherein said configuration settings configure said end user equipment to receive a service provided by said predetermined service provider subject to said access settings, wherein said end user equipment is initially configured by a service broker to enable said predetermined service provider to control and configure said end user equipment.

* * * * *